Aug. 27, 1929.  A. W. ROCKWOOD  1,725,998

INTERLACING TRIMMING AND PROCESS OF MAKING

Filed Dec. 7, 1926

Inventor
A. Waldo Rockwood
by James R. Hodder
Attorney

Patented Aug. 27, 1929.

1,725,998

UNITED STATES PATENT OFFICE.

A. WALDO ROCKWOOD, OF WINCHESTER, MASSACHUSETTS.

INTERLACING TRIMMING AND PROCESS OF MAKING.

Application filed December 7, 1926. Serial No. 153,187.

My present invention is a novel and improved trimming for use on shoes, hats, or any articles of clothing, as well as for automobile bodies, and comprises a novel process of manufacturing my new trimming.

Especially in the manufacture of women's pumps, slippers, shoes, hats, and the like, is it desirable to have an ornamental trimming which must also be of sufficient durability for wearing purposes.

Heretofore, in the manufacture of such trimming, small strips of leather or the like have been utilized, and if a design was desired, it was customary to cut the pattern desired by specially prepared dies. Sometimes, even, two strips have been used, and interwoven after the manner of making rope, the strips usually being of differing colors so as to accentuate the ornamental effect. An objection to this interwoven type is that this trimming will unravel whenever severed, and when this trimming comes in long strips, the waste from many cuttings becomes very appreciable.

More and more the public has been demanding fancy trimmings, thus necessitating the continual replacing of these former trimmings by more and more fanciful and intricate patterns, until at the present time it is difficult to devise a new design cut from a single strip or twisted like rope. With this situation in mind I have devised my novel interlaced trimming, comprising two or more strips of any suitable material, preferably leather, interlaced compactly with one another to produce any desired ornamental effect, said interlacing process adding materially both to the ornamental effect, and to the strength and durability of my trimming.

In carrying out the present novel process of my invention, I utilize strips of such trimming as may be decided upon to produce the desired pattern and color effect, said strips being of any length and width, which may be suitable. I then take two such strips, so cut out and made that they may be interlaced, and perform this lacing operation by means of a bodkin or any suitable instrument. The two strips fit together exactly, thus aiding in producing a neater and stronger result. By this method I may interlace strips of trimming of the same or differently colored leather, or the like, forming innumerable designs and patterns; in fact, there is no limit to the number of combinations that may be worked out by my novel process of interlaced trimming.

Another feature of my invention is the lack of waste occurring whenever my trimming is cut. Due to the interlacing process the strips are held very firmly together and will not unravel upon severing.

Referring to the drawings illustrating preferred embodiments of my invention

Figure 1:
Fig. 1 is a detail of a portion of one of the strips utilized in my novel trimming.
Figure 2:
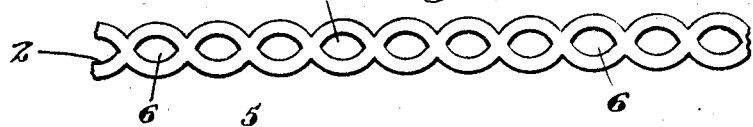
Fig. 2 is an enlarged detail of a cooperating strip.
Figure 3:
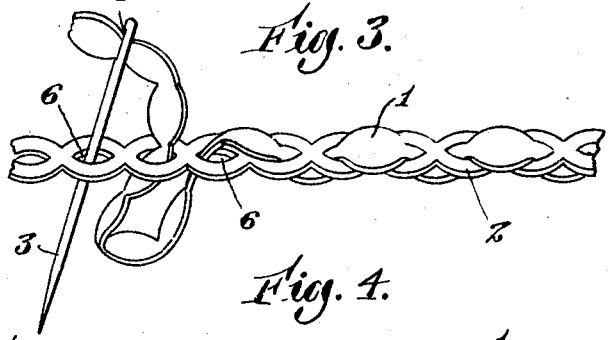
Fig. 3 illustrates one method of joining the strips of Figs. 1 and 2.
Figure 4:
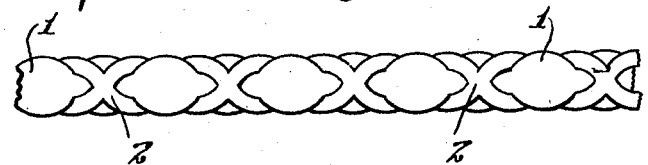
Fig. 4 is a detail of the finished trimming.

As shown in the drawings, in Figs. 1 and 2, the numerals 1 and 2 represent strips of any suitable material, preferably leather, both cut out by using predetermined dies, strips that may be readily interlaced by the method shown in Fig. 3, using a bodkin 3, representative of any suitable method of performing this interlacing. The bodkin 3 is slipped on strip 1 through slit 5 and then passed over and under holes 6, 6, in strip 2 until as long a trimming as desired is effected. The strips 1 and 2, when thus secured, fit together very compactly, and cured, fit together very compactly, and jointly aid in producing a very strong and serviceable trimming, which is especially desirable where narrow and decorative straps for women's shoes are concerned.

Figure 5:
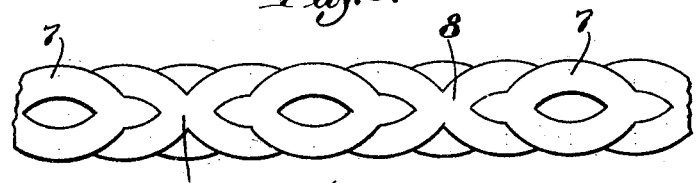
Figs. 5 and 6 are details of modifications.

In Fig. 5 two complemental strips 7 and 8 are so designed that they interlace compactly, as well as illustrating by way of example another type of design.

Figure 6:
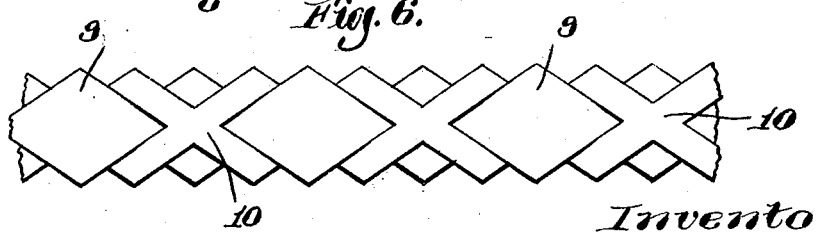

In Fig. 6 two complemental strips 9 and 10 are similarly interlaced, forming again an illustrative and modish type of trimming.

It will thus be seen that I have devised a novel method of effecting a new trimming. My trimming complies with the growing desire of the public for more and more decorative and complicated styles of trimming, and has proved its desirability commercially.

My invention is further defined and described in the form of a claim as follows:

As a new article of manufacture, trimming comprised of a pair of strips, each of the same width and with a predetermined design formed in and repeatedly duplicated in each strip, and in which one of the strips is provided with openings spaced at intervals along the length thereof and in fixed relation to the design formed in the strip and through which openings is laced the other strip.

In testimony whereof, I have signed my name to this specification.

A. WALDO ROCKWOOD.